Figure 1:
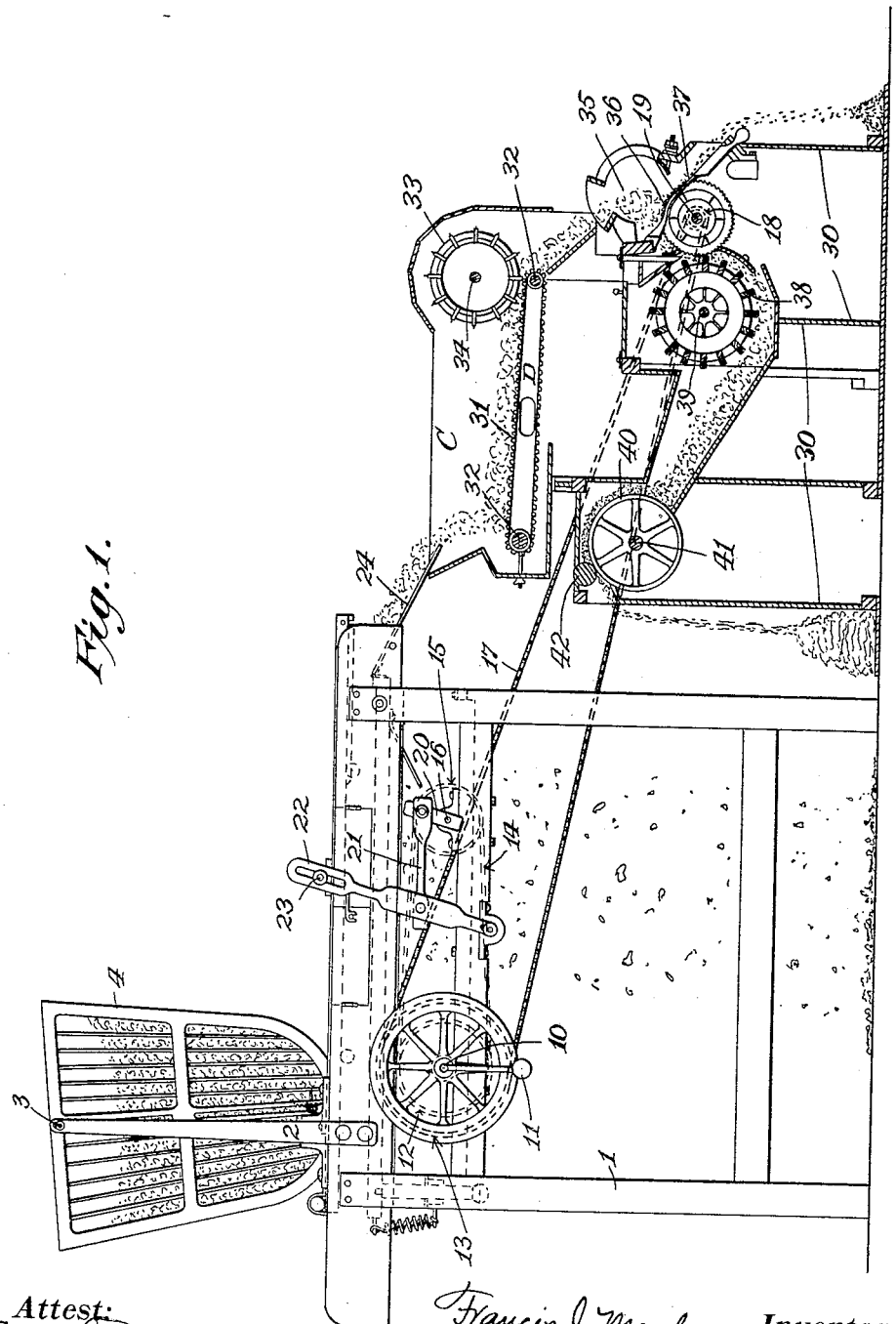

F. J. MAUBORGNE.
PROCESS OF TREATING COTTON.
APPLICATION FILED OCT. 24, 1911.

1,056,195.

Patented Mar. 18, 1913.

2 SHEETS—SHEET 1.

Attest:
Edna L. Moreland
Alan C. McDonnell

Francis J. Mauborgne, Inventor:
by William R. Baird
his Atty

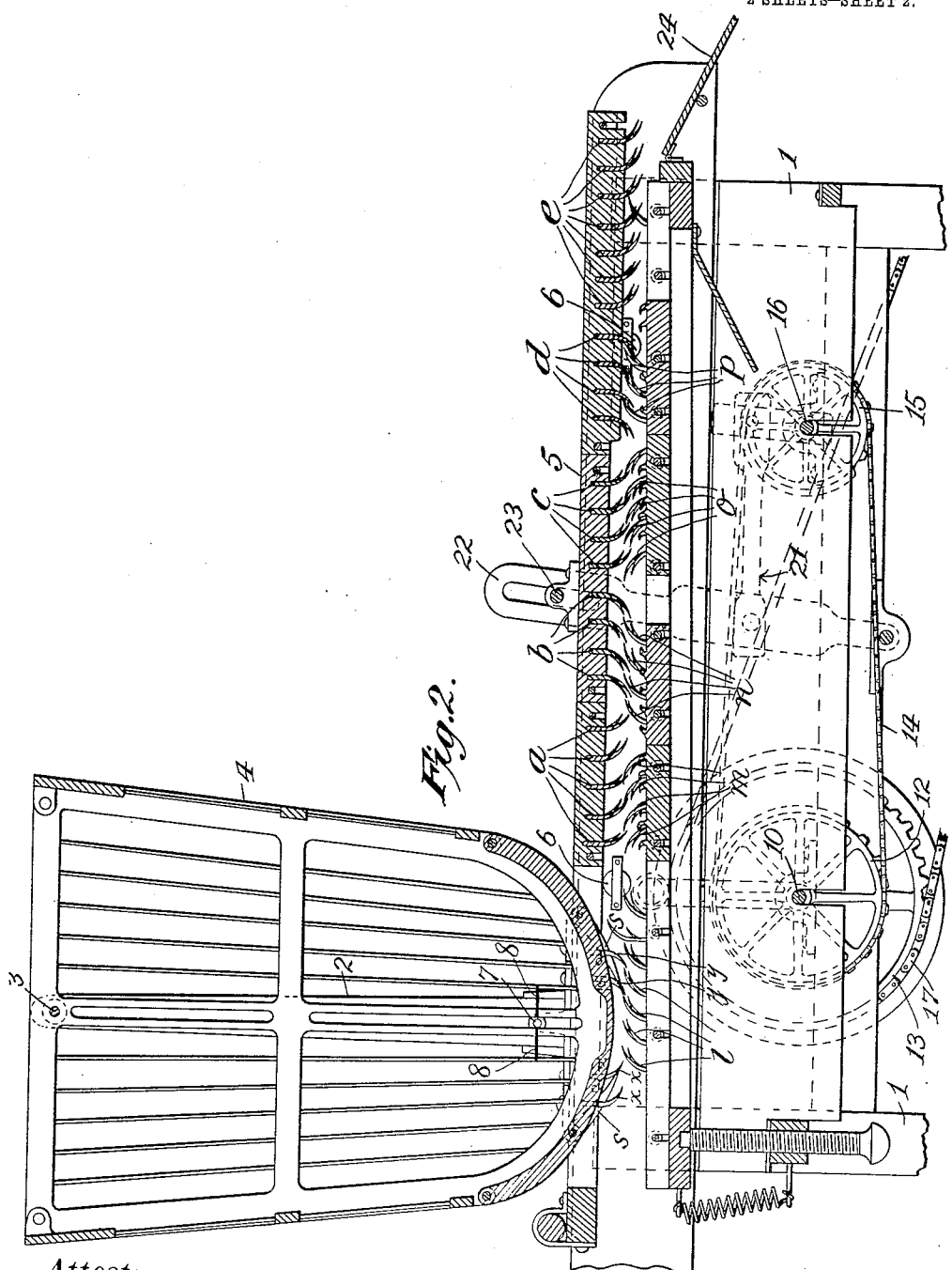

UNITED STATES PATENT OFFICE.

FRANCIS J. MAUBORGNE, OF NEW YORK, N. Y.

PROCESS OF TREATING COTTON.

1,056,195. Specification of Letters Patent. Patented Mar. 18, 1913.

Application filed October 24, 1911. Serial No. 656,393.

*To all whom it may concern:*

Be it known that I, FRANCIS J. MAUBORGNE, a citizen of the United States, residing at New York, in the county of New York and State of New York, have invented certain new and useful Improvements in the Process of Treating Cotton, of which the following is a specification.

This invention relates to a new process of treating cotton for the purpose of separating the staple or lint from the seeds, and its novelty consists in the several successive steps of the process employed and in their relation to each other.

When cotton is picked from the cotton plant it is done under varying conditions. The general state of the crop, the availability of labor and the condition of the weather have important effects upon the picking. Under certain conditions the cotton is picked as soon as the bolls show the first sign of the staple, that is to say, when the bolls are still unripe. Under other conditions it is not picked until the boll is wide open and the seed cotton is practically in a condition where it will fall on the ground or be blown away by the wind. In the first instance, the fibers are found to be tightly wound on the seeds and intertwined so tightly among themselves as to practically form a solid mat. As the bolls become riper the toughness of this mat and its solidity decrease, but even at the ripest stage of the cotton the fibers are never entirely separated from one another.

The value of lint cotton is dependent to a great extent on the length of its fiber, and when this fiber is shortened by cutting or tearing, its value as a whole is greatly depreciated.

By the present methods of separating the lint from the seeds, that is to say, by the usual methods of ginning now employed, the lint is torn completely away from the seed immediately upon coming into contact with the ginning device, and this is so no matter which one of the usual ginning devices is employed. The result is that all of the present devices for ginning known to me tear or cut the fiber, shortening its length and thereby materially reducing its value, and, of course, this impairment of value of the cotton is greatest when the cotton is greenest.

The object of my invention is to provide a process that will overcome the shortening of the fiber and will leave it in a longer and better condition.

In practising this process, I take seed cotton as it comes from the plant and pass the same through an apparatus whereby the fibers are first gently combed or carded or opened one from the other without attempting to separate the lint from the seeds at this stage of the operation, and then when the fibers have been sufficiently separated from each other, to break them from the seeds by the usual ginning operation, thereby preserving the fiber at substantially the length at which it was grown in the plant.

In Letters Patent of the United States No. 969,176, issued to me September 6th, 1910, I have described an apparatus which is preferably used in carrying out my invention and in which the cotton is described as subjected to a more or less prolonged picking and opening operation preliminary to the step of separating the fibers from the seeds, whereby the cotton fibers are combed and opened while still on the seeds, and are disentangled from each other to a considerable extent, and are freed from leaves and dirt, so that in the subsequent operation of separating the fibers from the seeds, such separation will take place nearer to the points of attachments of the fiber to the seeds and the lint is secured cleansed from extraneous matter. In this apparatus I described a ginning section as well as a carding section in the device, but it will be obvious that in carrying out the process any carding and opening apparatus may be employed which will effectually carry out that step of the process, and that in the same manner any ginning apparatus may be employed which may be used for carrying out that step of the process.

In the drawings Figure 1 is a side elevation of the carding mechanism and a vertical section of the ginning mechanism, and Fig. 2 is a central vertical section of the upper part of the carding mechanism.

In the drawings, 1 represents a frame made of any suitable size and material and adapted to support the carding mechanism, 2, 2 are uprights secured to the frame and provided with a cross bar 3 upon which is suspended a rocking hopper 4. Mounted within the frame is a carriage 5 adapted to reciprocate on rollers 6 provided for that purpose. This carriage is provided with downwardly projecting hooks arranged in series; a, c and e designating hooks pointing forward, and b and d hooks pointing rearward. It is also provided with a cross shaft 7 passing loosely through a slot in the side of the hopper, and which shaft has radially arranged arms 8 adapted to assist in carrying down the cotton through the bottom of the hopper which is slatted.

Arranged beneath the carriage 5 is a frame 9, which is suitably pivoted to the frame, and provided with upwardly projecting carding hooks arranged in series; l, n and p designating hooks pointing forward and m and o designating hooks pointing rearward.

s, s, designate fingers on the bottom of the hopper and x, x and y, y, downwardly pointing hooks on the bottom of the hopper, the former pointing forward and the latter rearward.

A main shaft 10 is suitably journaled in the frame 1 and actuated by a handle 11 or in any other suitable manner. On it are mounted sprocket wheels 12 and 13, the former adapted through a chain 14 to actuate a sprocket 15 mounted on a shaft 16 and the latter through a chain 17 adapted to actuate a sprocket 18 mounted on a shaft 19 in the frame 30 of the ginning mechanism. At each end of the shaft 16 are cranks 20 each connected by a link 21 to a rocking arm 22 pivoted to the frame 1 and adapted to engage a cross rod 23 secured to the carriage 5. At the end of the frame there is secured a delivery chute 24 leading to the ginning section.

For further details of the construction of the carding section reference is made to Letters Patent 969,176 above referred to.

30 represents the frame of the ginning mechanism. It is provided with a traveling lattice 31 actuated by and supported upon rollers 32, 32, suitably journaled in the frame. A spiked roller 33 mounted on a shaft 34 is mounted to rotate near one end of this lattice.

35 is a hopper located over a series of saws indicated at 36, all mounted on the common shaft 19 and adapted to rotate between the members of a grating 37 indicated at 36.

38 is a brush mounted on a shaft 39 to contact with the saws 36.

40 is a hollow perforated roller mounted on a shaft 41 and preferably supplied internally with a suction apparatus (not shown), and 42 is a discharge roller adapted to facilitate the delivery of the lint from the apparatus.

It will be understood that the several shafts 34, 39, 40 and 32 and the roller 42 are actuated from the shaft 19 by suitable power connections or are otherwise actuated in harmony with the remainder of the mechanism in any usual manner, within the skill of an ordinary mechanic to provide.

The first step of the process is carried out in the carding mechanism of the apparatus. The cotton is placed in the hopper 4 and the shaft 10 is actuated. This reciprocates the carriage 5 and oscillates the hopper. The result is that the cotton is fed forward between the series of hooks on the frame and the carriage, and by their mutual action upon it, is combed out and opened up, in fact carded until its fibers lie largely in the same direction and it is delivered from the chute 24 into the ginning mechanism. During this carding operation much dirt, leaves and some seeds will be freed from the fibers and will fall to the bottom of the device, but its chief purpose is to open up, separate, straighten out and comb and card the fibers.

The second step of the process is carried out in the ginning or seed separating mechanism of the apparatus. In this apparatus the cotton in its combed and carded condition, as it is discharged from the mechanism above described, is allowed to fall upon the lattice 31 by which the fibers are carried to the roller 33 which deliver them through the hopper 35 upon the grating 36. At this place they are ginned. The saws 37 seize the fibers and pull them through the space between the grids which spaces are too small to allow the seeds to pass, and these fall to the ground while the lint rotating with the saws is collected by the revolving brush 38. The exhaust within the perforated drum 40 draws the lint toward its surface and it is removed therefrom by the roller 42.

The results secured by the use of my process are economically important. It saves much of the fiber of the relative unripe cotton now cut to pieces by the gin saws. It preserves the long fibers and prevents the premature destruction of the short ones, and it makes a cleaner, and longer staple.

What I claim as new is:

1. The process of treating seed cotton which consists in subjecting the same to a progressive and successive combing action to disentangle the fiber and cause the same to lie in substantially parallel relation longitudinally of the direction of movement of the seed cotton, and afterward subjecting the combed cotton to a ginning operation.

2. The process of treating seed cotton which consists in subjecting it to a progressive and successive combing action in different directions but in substantially parallel lines whereby the fiber is disentangled and caused to lie in substantially parallel relation longitudinally of the direction of the movement of the cotton, and afterward subjecting the cotton to a ginning operation.

In testimony whereof I affix my signature in presence of two witnesses.

FRANCIS J. MAUBORGNE.

Witnesses:
E. W. SCHERR, Jr.,
ALAN C. McDONNELL.

Copies of this patent may be obtained for five cents each, by addressing the "Commissioner of Patents, Washington, D. C."